(12) United States Patent
Salim et al.

(10) Patent No.: US 10,959,377 B2
(45) Date of Patent: Mar. 30, 2021

(54) CROP SCANNER

(71) Applicant: Commonwealth Scientific and Industrial Research Organisation, Acton ACT (AU)

(72) Inventors: Michael Salim, Acton (AU); Peter Kuffner, Acton (AU); Jose Antonio Jimenez Berni, Acton (AU); Xavier Raymond Richard Sirault, Acton (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 14 days.

(21) Appl. No.: 16/469,869

(22) PCT Filed: Dec. 15, 2017

(86) PCT No.: PCT/AU2017/051400
§ 371 (c)(1),
(2) Date: Jun. 14, 2019

(87) PCT Pub. No.: WO2018/107242
PCT Pub. Date: Jun. 21, 2018

(65) Prior Publication Data
US 2020/0077588 A1 Mar. 12, 2020

(30) Foreign Application Priority Data

Dec. 16, 2016 (AU) .................. 2016905220
Aug. 22, 2017 (AU) .................. 2017903379

(51) Int. Cl.
*A01D 46/30* (2006.01)
*G01S 7/481* (2006.01)
(Continued)

(52) U.S. Cl.
CPC ............ *A01D 46/30* (2013.01); *G01S 7/4817* (2013.01); *G01S 17/89* (2013.01); *G01C 3/08* (2013.01)

(58) Field of Classification Search
CPC ....... A01D 46/30; G01S 7/4817; G01S 17/89; G01C 3/08
See application file for complete search history.

(56) References Cited

U.S. PATENT DOCUMENTS

| 5,911,669 A | 6/1999 | Stentz et al. |
| 2006/0278142 A1 | 12/2006 | Carr et al. |

(Continued)

FOREIGN PATENT DOCUMENTS

WO    WO 1996/002817    2/1996

OTHER PUBLICATIONS

Garrido, Miguel et al., "Active Optical Sensors for Tree Stem Detection and Classification in Nurseries", *Stensors*, published Jun. 19, 2014; pp. 10783-10803, V14, MDPI, Basel, Switzerland.

(Continued)

*Primary Examiner* — Jamil Ahmed
(74) *Attorney, Agent, or Firm* — Brinks Gilson & Lione

(57) ABSTRACT

This disclosure relates to a system for scanning crops. A line scan distance sensor measures a distance of the crops from the sensor and generates distance data indicative of the distance of the crops from the sensor at a measurement angle. A mover system moves the line scan distance sensor or the crops perpendicular to the distance of the crops from the sensor. A rotary encoder associated with the mover system generates movement data indicative of a movement of the distance sensor or the crops perpendicular to the distance of the crops from the sensor. A data collector associates the distance data from the distance sensor with relative positioning data based on the movement data from (Continued)

the rotary encoder and stores the distance data associated with the relative positioning data on a data store. The system allows accurate relative spatial alignment of sequential line scans. As a result, an extremely high resolution in the direction of movement can be achieved.

20 Claims, 6 Drawing Sheets

(51) Int. Cl.
  *G01S 17/89* (2020.01)
  *G01C 3/08* (2006.01)

(56) References Cited

U.S. PATENT DOCUMENTS

2007/0269114 A1  11/2007  Jochem et al.
2013/0019332 A1  1/2013  Stachon et al.
2013/0067808 A1  3/2013  Stachon et al.
2014/0180549 A1*  6/2014  Siemens ............ A01B 79/005
                                                     701/50
2015/0015697 A1*  1/2015  Redden ............ G01N 33/0098
                                                     348/89

OTHER PUBLICATIONS

International Search Report from AU Application No. 2016905220, dated Feb. 14, 2017, 9p.
Written Opinion of the ISA from PCT Application No. PCT/AU2017/051400, dated Mar. 28, 2018, 7p.
International Search Report from PCT Application No. PCT/AU2017/051400, dated Mar. 28, 2018, 8p.

* cited by examiner

CROP SCANNER

CROSS-REFERENCE TO RELATED APPLICATIONS

This application is the U.S. National Stage application of PCT application no. PCT/AU2017/051400, filed on Dec. 15, 2017, titled Crop Scanner, designating the United States the content of which is incorporated herein by reference. PCT application no. PCT/AU2017/051400 claims priority from Australian provisional application no. 2016905220 filed on 16 Dec. 2016 the content of which is incorporated herein by reference. PCT application no. PCT/AU2017/051400 also claims priority from Australian provisional application no. 2017903379 filed on 22 Aug. 2017 the content of which is incorporated herein by reference.

TECHNICAL FIELD

This disclosure is related to systems and methods for scanning crops. In particular, but not limited to, this disclosure relates to scanning crops to determine crop trait values (i.e. biophysical parameters), including biomass and growth, for artificial selection.

BACKGROUND

Selective breeding comprises the determination of crop traits as phenotypes and selecting those crops with desired traits for further propagation. Crop traits may include biomass and canopy height and the determination of biomass and canopy height may involve destructive testing and/or LIDAR measurements. LIDAR measurements are performed by directing a laser beam at the crop and measuring the return time of the reflection off the crop. Based on the return time a distance to the LIDAR sensor can be determined, which, in turn, can be used to estimate biomass and canopy height.

Current LIDAR crop scanners use GPS to record multiple locations while scanning the crop. For example, Pittman et al. disclose a modified golf cart fitted with a LIDAR sensor and GPS configured to output spatial data at a rate of 10 Hz (Jeremy Joshua Pittman, Daryl Brian Arnall, Sindy M. Interrante, Corey A. Moffet and Twain J. Butler. "Estimation of Biomass and Canopy Height in Bermudagrass, Alfalfa, and Wheat Using Ultrasonic, Laser, and Spectral Sensors". Sensors 2015, 15, 2920-2943).

Chen discloses systems for LiDAR Remote Sensing of Vegetation Biomass (Chen, Q. Lidar remote sensing of vegetation biomass. In Remote Sensing of Natural Resources; Wang, G., Weng, Q., Eds.; CRC Press, Taylor & Francis Group: Boca Raton, Fla., USA, 2013; pp. 399-420.). Chen further discloses that the 3D coordinates of laser returns collected at individual scanning positions are local and relative to the scanners. Further, according to Chen the individual datasets have to be georeferenced to a common coordinate system based on features visible to multiple positions, which is not a trivial task. To make it more difficult, ground-based LiDAR systems can acquire data with point densities 100-1000 times higher than the average point density of airborne small-footprint LiDAR systems. Such massive volumes of data pose a significant challenge in developing fast, automatic, and memory-efficient software for data processing and information extraction.

Biber et al. disclose an autonomous agricultural robot comprising a 3D MEMS LIDAR providing a full scan at 59×29 pixels across the field of view of 50×60 degrees (Peter Biber, Ulrich Weiss, Michael Dorna, Amos Albert. Navigation System of the Autonomous Agricultural Robot "BoniRob". Workshop on Agricultural Robotics: Enabling Safe, Efficient, and Affordable Robots for Food Production (Collocated with IROS 2012), Vilamoura, Portugal). A RANSAC algorithm is used to fit a Hessian plane equation to the data. The detected plane is then refined by a Least Squares fit. Number of inliers and residuals of the Least Squares are then considered to detect failed ground detection. Also, a Kalman filter tracks the state of the plane over time. If the ground detection failed the state is just propagated. Depending on the field the detected ground can correspond to soil or the canopy. Also the thresholds for plane detection have to be set according to the application. Further, as a side effect of ground detection it is possible to derive the height and the tilt angle of the scanner so only the x/y position of the scanner are defined manually in the configuration.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

A system for scanning crops comprises:

a line scan distance sensor to measure a distance of the crops from the sensor at one or more points along a line by illuminating the crops with light at a measurement angle that defines the line and detecting reflected light, and to generate distance data indicative of the distance of the crops from the sensor at the measurement angle at a scanning rate of line scans;

a mover system to move the line scan distance sensor or the crops substantially perpendicular to the distance of the crops from the sensor;

a rotary encoder associated with the mover system to generate movement data indicative of a movement of the distance sensor or the crops substantially perpendicular to the distance of the crops from the sensor at an encoder rate that is higher than the scanning rate of line scans from the line scan distance sensor when the mover moves the line scan distance sensor at a scanning speed; and a data collector to associate the distance data from the distance sensor with relative positioning data based on the movement data from the rotary encoder and to store the distance data associated with the relative positioning data on a data store.

It is an advantage that the use of a line scan distance sensor is more robust and computationally more efficient than the use of a 3D scanner. It is a further advantage that accurate relative positioning data can be created from the rotary encoder data. This allows accurate relative spatial alignment of sequential line scans. As a result, an extremely high resolution in the direction of movement can be achieved. The combination of a line scan distance sensor with a rotary encoder provides an accuracy that is sufficient to resolve individual leaves which allows accurate crop monitoring.

The mover may be a vehicle. The mover may be a gantry.

The line scan distance sensor may be downwardly directed towards the ground. The line scan distance sensor may be directed sidewardly.

The relative positioning data may have an accuracy of 1 cm or higher.

The rotary encoder may be configured to generate detection signals at an encoder rate that is higher than a scanning rate of line scans from the line scan distance sensor when the mover moves the line scan distance sensor at a scanning speed.

The scanning speed may be 1 m/s or faster.

The scanning rate may be 500 Hz or less.

The encoder rate may be at least ten times higher than the scanning rate.

The line scan distance sensor may be further configured to generate intensity data indicative of an intensity of the reflected light and the data collector may be configured to associate the intensity data from the distance sensor with relative positioning data based on the movement data from the rotary encoder and to store the intensity data associated with the relative positioning data on the data store.

The light may be laser light. The laser light may be red laser light having a wavelength between 625 nm and 740 nm.

The system may further comprise a second line scan distance sensor to measure a distance of the crops from the second line scan distance sensor along the line, wherein the second line scan distance sensor is offset or tilted relative to the first line scan distance sensor.

The line scan distance sensor may configured to repeatedly measure the distance of the crops from the sensor along multiple lines to generate distance data for each of the multiple lines, and the data collector may be configured to associate the distance data from each of the multiple lines with relative positioning data indicative of a relative position of that line.

A method for scanning crops comprises:

illuminating the crops with light at a measurement angle that defines a line;

measuring a distance of the crops from a distance sensor at one or more points along the line by detecting reflected light;

generating distance data indicative of the distance of the crops from the sensor at the measurement angle at a scanning rate;

moving the distance sensor or the crops substantially perpendicular to the distance of the crops from the distance sensor;

generating movement data indicative of a movement of the distance sensor or the crops substantially perpendicular to the distance of the crops from the sensor at an encoder rate that is higher than the scanning rate of line scans from the distance sensor when moving the distance sensor at a scanning speed;

associating the distance data from the distance sensor with relative positioning data based on the movement data; and storing the distance data associated with the relative positioning data on a data store.

The method may further comprise uploading the distance data associated with the relative positioning data to a processing server to cause the processing server to calculate a crop trait value. The crop trait value may comprise or may be indicative of a biophysical characteristic.

Uploading the distance data may comprise uploading more than 5,000 distance data points to the processing server to cause the processing server to calculate one crop trait value based on the more than 5,000 distance data points.

Measuring the distance of the crops from the distance sensor may comprise providing a scan angle value associated with a distance value and generating the distance data may comprise calculating a crop height above ground based on the distance value and the scan angle value.

Calculating the crop height above ground may be based on a predetermined sensor height above ground.

A method for crop trait identification comprises:

receiving distance data comprising multiple line scans of a monitoring area generated at a scanning rate, each of the multiple line scans being associated with relative positioning data generated at an encoder rate that is higher than the scanning rate when moving the distance sensor at a scanning speed, the distance data being indicative of a relative position corresponding to that line scan within the monitoring area;

aggregating the distance data into a crop trait value for the monitoring area based on the distance data.

The distance data may further comprise intensity data and aggregating the distance data comprises aggregating the intensity data into the crop trait value.

The distance data may comprise a scan angle value associated with a distance value and aggregating the distance data may comprise calculating a crop height above ground based on the distance value and the scan angle value.

Calculating the crop height above ground may be based on a predetermined sensor height above ground.

The distance data may comprise multiple line scans of multiple monitoring areas and aggregating the distance data may comprise aggregating the distance data for each of the multiple monitoring areas into a crop trait value for each of the multiple monitoring areas.

Each of the multiple monitoring areas may be associated with a different crop population.

The method may further comprise automatically detecting the multiple monitoring areas based on the distance data and the relative positioning data.

The method may further comprise generating a display to indicate a highly performing monitoring area out of the multiple monitoring areas based on the crop trait value.

The method may further comprise selecting a population associated with one of the multiple monitoring areas based on the crop trait value for further breeding.

The method may further comprise instantiating one or more virtual machines, aggregating the distance data by the one or more virtual machines and destroying the one or more virtual machines.

Aggregating the distance data into a crop trait value may be based on correlation data indicative of a correlation between historical distance data and historical crop trait values.

The historical crop trait values may be indicative of measured historical crop trait values of sampled crops.

The method may further comprise determining the correlation data by performing machine learning on the historical distance data and historical crop trait values.

A computer system for crop trait identification comprises:

an input port to receive distance data comprising multiple line scans of a monitoring area, each of the multiple line scans being associated with relative positioning data indicative of a relative position corresponding to that line scan within the monitoring area; and a processor to aggregate the distance data into a crop trait value for the monitoring area based on the distance data.

Reproductive or regenerative material may be obtained by performing the above method.

A plant may be produced by performing the above method.

A food product may be derived from the above plant.

A system for scanning crops comprises:

a line scan distance sensor to measure a distance of the crops from the sensor at one or more points along a line by illuminating the crops with light at a measurement angle that defines the line and detecting reflected light, and to generate distance data indicative of the distance of the crops from the sensor at the measurement angle;

a mover system to move the line scan distance sensor or the crops substantially perpendicular to the distance of the crops from the sensor;

a movement sensor associated with the mover system to generate movement data indicative of a movement of the distance sensor or the crops substantially perpendicular to the distance of the crops from the sensor;

a data collector to associate the distance data from the distance sensor with relative positioning data based on the movement data from the movement sensor and to store the distance data associated with the relative positioning data on a data store.

Optional features described of any aspect of method, computer readable medium or computer system, where appropriate, similarly apply to the other aspects also described here.

BRIEF DESCRIPTION OF DRAWINGS

An example will be described with reference to

DESCRIPTION OF EMBODIMENTS

This disclosure provides systems and methods for accurate and high-throughput crop phenotyping. The disclosed systems associate line scanner data with a high resolution rotary encoder to provide distance data with high local alignment accuracy. This allows for a more accurate, faster and non-destructive determination of crop traits, which can be used to select the best performing crops from a larger number of populations, such as plots, for future breeding.

Figure 1:
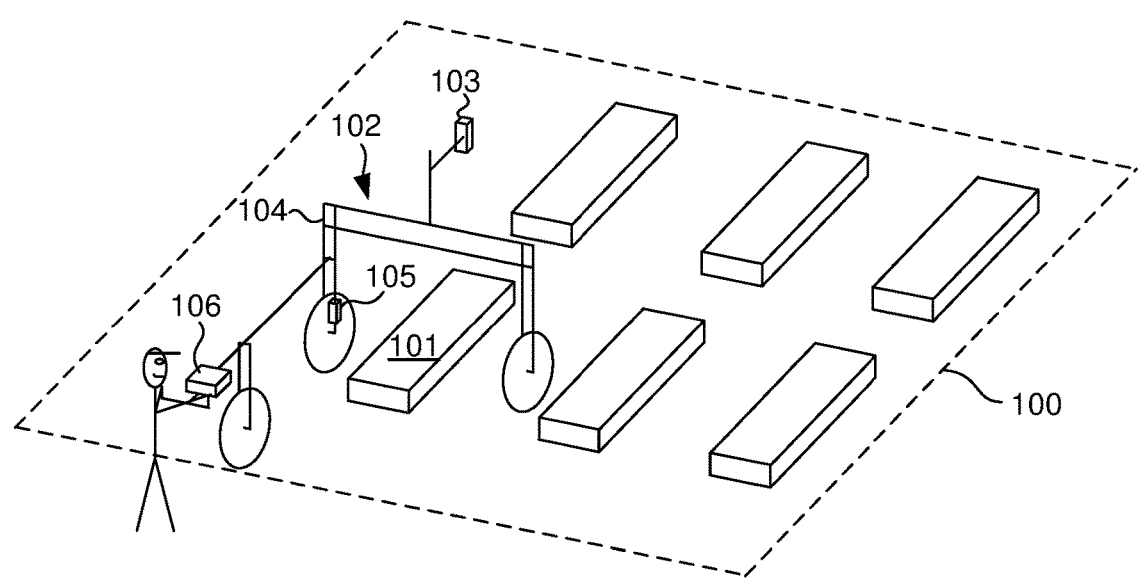
FIG. 1 schematically illustrates a field comprising multiple plots and a crop scanner.

FIG. 1 schematically illustrates a field 100 of crops comprising multiple plots, such as plot 101 and a crop scanner 102. The crops or plants in one plot may be referred to as group of individuals or a population and the aim is a genetic gain in that population without genetic testing or assisted by genetic testing. The crops may be wheat, rice cereal and other crops such as canola and grapevines. Crop scanner 102 comprises a line scan distance sensor 103, a mover system 104, a rotary encoder 105 and a data collector 106. It is noted that some examples herein relate to a vehicle as crop scanner 102. However, in other examples, crop scanner may be a fixed gantry and the crops are moved through the gantry, such as on a conveyor belt.

Distance Sensor

Figure 2:
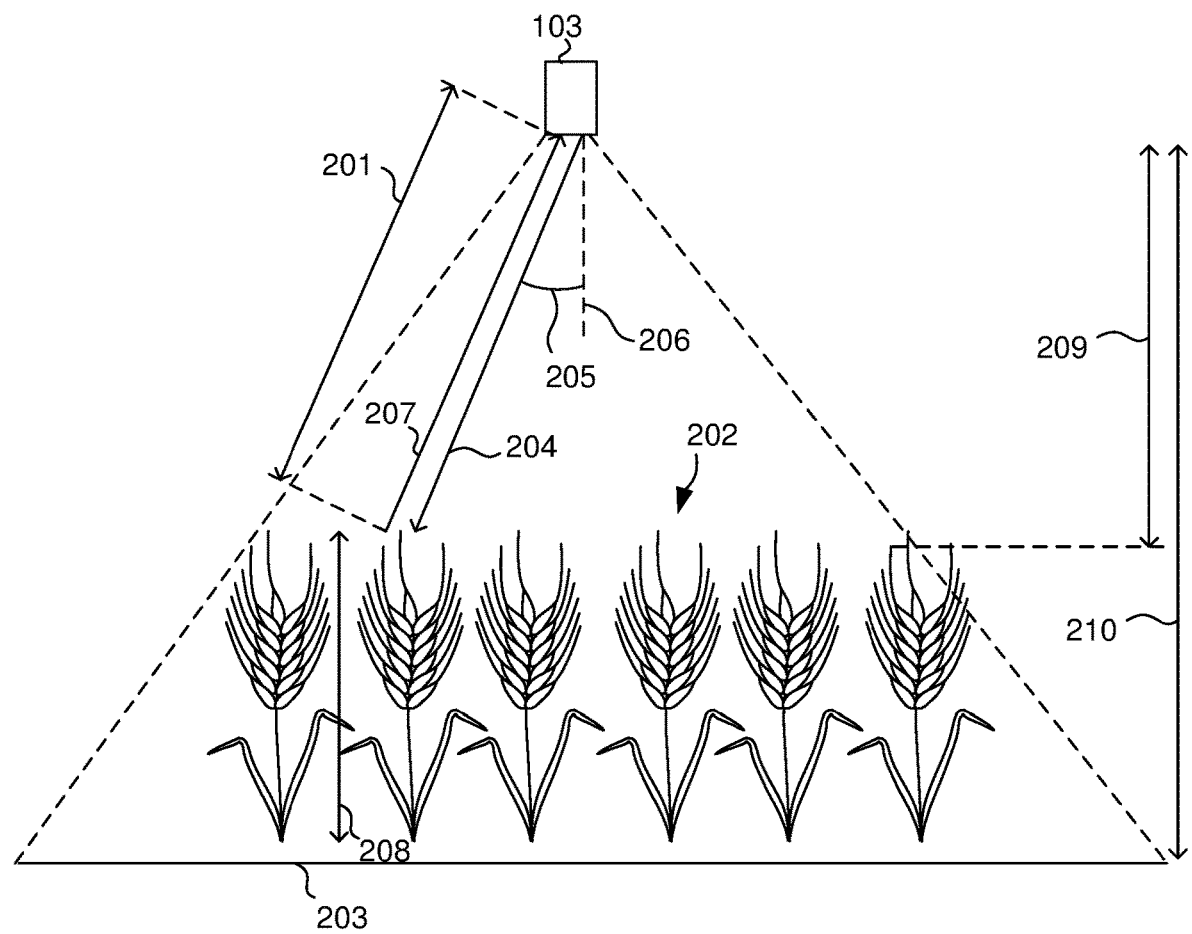
FIG. 2 is an front elevation view of a line scan distance sensor.

FIG. 2 illustrates line scan distance sensor 103 mounted on the crop scanner 102 (not shown in FIG. 2) as seen from the front. A possible device may be LMS400, 70. FOV, SICK AG, Waldkirch, Germany. Line scan distance sensor 103 measures a distance 201 of the crops 202 from the sensor along a line 203. Line scan distance sensor 103 illuminates the crops 202 with a laser beam 204 at a measurement angle 205. In this example, the measurement angle 205 is taken between a vertical line 206 and the laser beam 204. The measurement angle 205 defines the line 203 in the sense that as the measurement angle 205 increases, the laser beam 204 is directed at points along the line 203. In other words, if the measurement angle 205 is increased rapidly so that the laser beam 204 rotates around the sensor 103, a person would be able to see a red line on the ground in the case of a red laser.

Sensor 103 detects reflected light 207 and measures the time of flight, that is, the time between sending the laser beam 204 and receiving the reflected light 207. Sensor 103 can then calculate distance 201 by multiplying the time of flight by the speed of light. In another example, sensor 103 detects a phase shift and calculates the distance based on the phase shift. This way, sensor 103 generates distance data indicative of the distance 201 of the crops from the sensor 103 at the measurement angle 205. Sensor 103 pulses laser beam 204 while increasing angle 205 to generate distance data for multiple points along line 203. For example, scanner 103 may comprise a rotating mirror, prism or MEMS device to increase angle 205 and may generate distance data at measurement angle increments of between 0.1 degrees and 1 degree, that is, for an aperture angle of 70 degrees there would be 70 to 700 distance data points along line 203 where the number of data points may be configurable. It is noted that the multiple values for the measurement angle may vary from one scan line to the next. In other words, the points where the crop is scanned may not be aligned across different scan lines. In the proposed solution, this has the advantage that further data becomes available since regions that may have been overstepped in one scan line are scanned in the next scan line.

In one example, data collector 106 calculates a height 208 of the crop 202 based on the distance data. To that end, data collector 106 calculates a vertical distance 209 by:

vertical_distance_209=cos(measurement_angle_205)
*distance_201.

Data collector then subtracts the vertical distance 209 from a mounting height 210 of sensor 103 to calculate the height 208 of the crop 202. Throughout the following description, when reference is made to calculations based on distance data, this may refer to calculations using the distance data explicitly or calculations using the crop height 208 that is based on the distance data.

In one example, the line scan distance sensor generates intensity data indicative of an intensity of the reflected light. The intensity is indicative of the reflectance of the illuminated material and changes between fresh green leaves, dry brown leaves and soil. This distinction can be emphasised by using red laser light. The data collector 106 in this example processes the intensity data from the distance sensor 103 together with or separately to the distance data as described further below.

It is noted that the distance sensor 103 may scan the crops 202 at a constant rate of laser pulses, which means that the distance between data points (spatial sampling rate) is minimal directly under the sensor 103 (in the direction of vertical 206) and maximal at the distal ends of line 203. In other words, the data points are further apart from each other towards the end of scan line 203 than in the middle of it. To improve the resolution of the distance data, a second distance sensor may be employed that is offset from distance sensor 103 parallel to scan line 203. In both cases, single or multiple sensors, the distance data may be stored in association with a distance along scan line 203 instead of a scan angle 205 according to line_dist=distance_201*sin(measurement_angle_205).

Mover System

As mentioned above, crop scanner 102 comprises mover system 104. Mover system 104 moves the line scan distance sensor 103 substantially perpendicular to the distance 201 of the crops from the sensor. In FIG. 2, the movement would be into the plane of the drawing keeping a constant distance 210 from the ground as defined by the geometry of the mover system 104. In one example, mover system 104 comprises three wheels, where two wheels are arranged in parallel to line 203 and the third wheel is arranged behind and in line with the left wheel of the two front wheels. The mover system 104 may be moved by an operator, such as by pushing the mover system 104. In other examples, mover system 104 comprises one or more motors and autonomous navigation system based on GPS and/or inertial navigation systems.

Rotary Encoder

Crop scanner 102 further comprises rotary encoder 105. The rotary encoder 105 may be associated with the mover system such as by being mounted onto one of the wheels. Rotary encoder 105 generates movement data indicative of a movement of the distance sensor substantially perpendicular to the distance 201 of the crops from the sensor as defined by the mover system 104.

Figure 3:
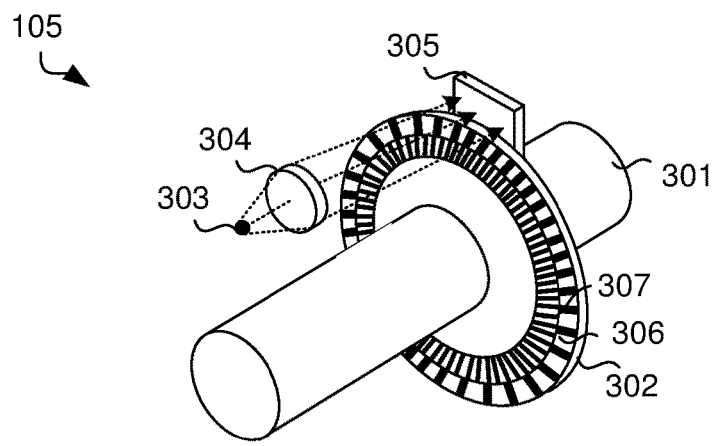
FIG. 3 illustrates an example rotary encoder.

FIG. 3 illustrates an example rotary encoder 105 mounted on a shaft 301, which may be the axle of the wheel. Rotary encoder 105 comprises a quadrature encoder 302 connected to shaft 301, a light source 303, such as an LED, a lens 304 and a photo detector 305. Quadrature encoder 302 comprises alternating transparent sections (shown in white) and occluding sections (shown in black). An outer ring 306 comprises 40 sections, while an inner ring 307 comprises 80 sections. Light from the LED 303 is focused by lens 304 and passes through the quadrature encoder 302. As the quadrature encoder 302 rotates together with shaft 301 the light is alternatingly blocked or transmitted, which results in a square waveform at the output of the photo detector 305. The frequency of the square waveform is directly related to the rotation speed of the shaft 301.

As the quadrature encoder has two rings 306 and 307 the photo detector 305 outputs two square waveforms where one square waveform has twice the frequency of the other square waveform. Data collector 106 in FIG. 1 is connected to photo detector 305 and receives the square waveforms. By detecting the relationship between the two square waveforms processor data collector 106 can determine the direction of rotation as well as the speed of rotation.

More particularly, at each rising or falling edge of the square waveform the data collector 106 determines that the crop scanner 102 has moved by a predefined distance. For example, the circumference of the wheels of the crop scanner 102 is 0.8 m and as a result, each rotation of the shaft relates to a moved distance of 0.8 m. Since the inner ring 307 comprises 80 transitions between transparent and occluding sectors, each edge of the square waveform associated with the inner ring 307 corresponds to a movement of 0.01 m, that is, the rotary encoder 105 provides a quadrature pulse every 0.01 m travel. For 1.5 m/s, this would result in 150 pulses per second. While the above examples were used for illustrative purposes, it is noted that significantly higher resolutions may be used, such as 800 sections leading to 1500 pulses per second or one pulse every 0.001 m travel. It is noted that since the encoder is used at the given resolution, a change in speed can be readily considered by the downstream data processing.

The rotary encoder 105 may be a DFV60A-22PC65536 (SICK AG, Waldkirch, Germany) providing 65,536 pulses per revolution which leads to a pulse every 12 μm (at a wheel circumference of 0.8 m).

In the example of a fixed gantry, the rotary encoder may be mounted on the driving wheel of a conveyor belt or similar mover. In the example of FIG. 1, the line scan distance sensor 103 is downwardly directed to the ground, which is suitable for vertically growing crops such as grain including wheat and rice. In other examples, the line scan distance sensor is directed sidewardly, which is suitable for fruit crops including grape vines.

Resolution

Figure 4:
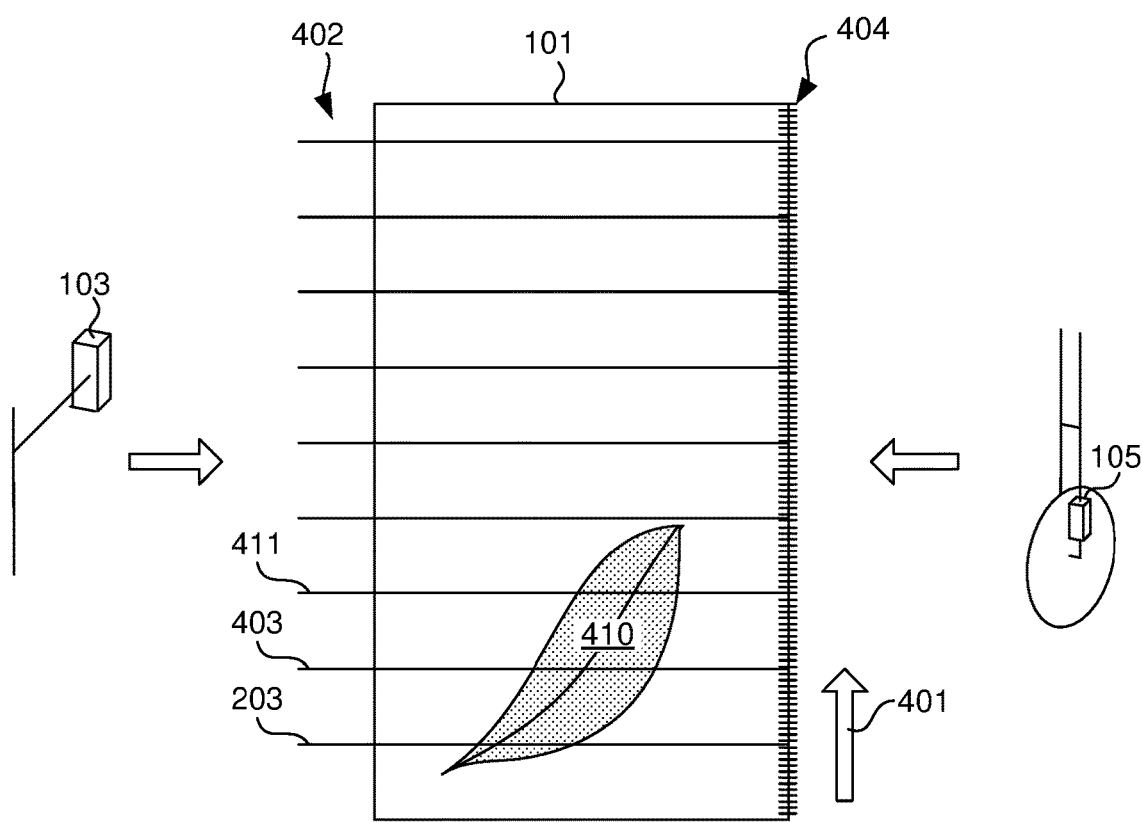
FIG. 4 is a plan view of one of the plots in FIG. 1.

FIG. 4 is a plan view of plot 101 in FIG. 1. On the left hand side there is an indication of scan lines 402 comprising scan line 203 as shown in FIG. 2. As the scanner 102 moves forwards as indicated by arrow 401 scanner 102 scans plot 101 along further scanlines, such as further scanline 403. In one example, the scanning rate is 100 Hz, which means that scanner 103 creates 100 scan lines per second. At a speed of 1.5 m/s this would result in 0.015 m between scan lines. On the right hand side are indications of pulses 404 from the rotary encoder 105. As can be seen in FIG. 5, the indications of pulses 403 are significantly more frequent than the indication of scan lines 402, which improves the overall accuracy of the system and in particular, the location reference of the scan lines 402. In other words, when the scan lines 402 are assigned to an absolute or relative position within plot 101 for later calculations, the accuracy of that position is limited by the distance between pulses 404. That is, if the distance between pulses is 0.001 m, then the accuracy of the location of the scan lines 402 is also 0.001 m in the example where the data collector 106 counts the number of pulses 404 between scan lines 402. Especially in application where the aim is to calculate an absolute quantitative measure, such as biomass, it is important that the location of the scan lines is accurate.

As an illustrative example, FIG. 4 also shows a leaf 410, which is part of the biomass of plot 101. Leaf 401 is scanned by three scanlines 203, 403 and 411 and the accurate distance between the scan lines 203/403 and 403/411 is indicated by the number of pulses 404 from rotary encoder 105. Due to the accurate distance measure, the size of the leaf and therefore the absolute measure of biomass can be accurately calculated. The absolute measure of biomass may be biomass per square meter or per another fixed surface area.

The following table provides further example configurations of the encoder rate and scan rate:

| speed [m/s] | # sectors | pulses [1/s] | enc. resolution [mm] | scan rate [1/s] | line dist [mm] |
|---|---|---|---|---|---|
| 1 | 800 | 1000 | 1 | 100 | 10 |
| 1.5 | 800 | 1500 | 1 | 100 | 15 |
| 3 | 800 | 3000 | 1 | 100 | 30 |
| 5 | 800 | 5000 | 1 | 100 | 50 |
| 10 | 800 | 10000 | 1 | 100 | 100 |
| 1 | 1600 | 2000 | 0.5 | 200 | 5 |
| 1.5 | 1600 | 3000 | 0.5 | 200 | 7.5 |
| 3 | 1600 | 6000 | 0.5 | 200 | 15 |
| 5 | 1600 | 10000 | 0.5 | 200 | 25 |
| 10 | 1600 | 20000 | 0.5 | 200 | 50 |
| 1 | 1600 | 2000 | 0.5 | 500 | 2 |
| 1.5 | 1600 | 3000 | 0.5 | 500 | 3 |
| 3 | 1600 | 6000 | 0.5 | 500 | 6 |
| 5 | 1600 | 10000 | 0.5 | 500 | 10 |
| 10 | 1600 | 20000 | 0.5 | 500 | 20 |

In the above table it can be seen that the line distance is greater than the encoder resolution, which means that multiple encoder pulses are received between scan lines, which enables accurate relative local positioning of the scan lines. In some examples, the encoder rate is at least ten times higher than the scanning rate. It is further shown that a large speed of 10 m/s can be used, which enables scanning of large plots in acceptable time or scanning of a larger number of plots to select from a larger number of individuals or groups of individuals, such as plots. This leads to higher genetic gain, that is higher performing crops, than with existing methods over the same time period.

Data Collector

Figures 5A, 5B:
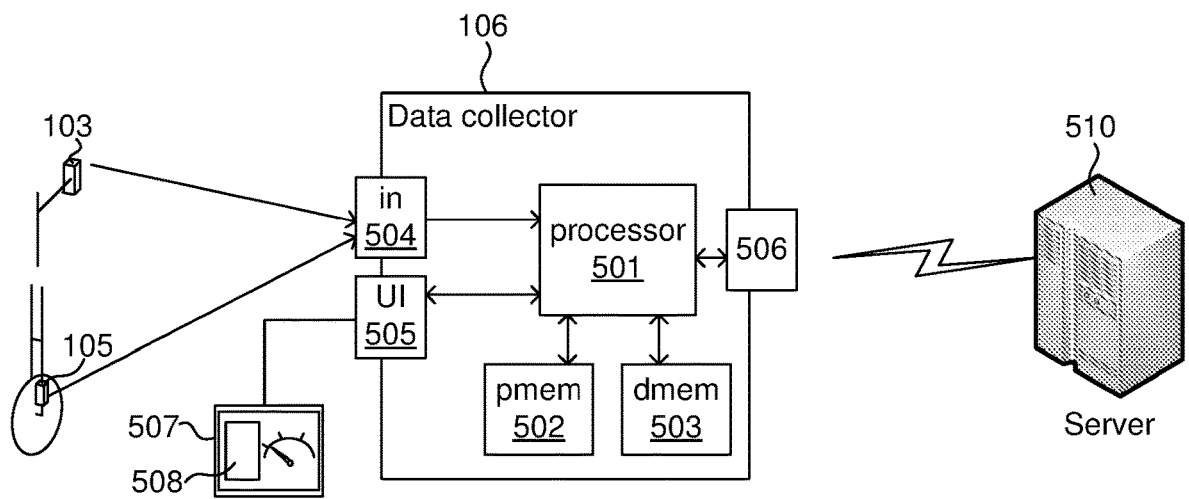
FIG. 5a illustrates the data collector from FIG. 1 in more detail.
FIG. 5b illustrates an example data format.

FIG. 5a illustrates data collector 106 in more detail. In particular, data collector 106 comprises processor 501 connected to program memory 502, data memory 503, data input port 504 and user interface port 505. The program memory 502 is a non-transitory computer readable medium, such as a hard drive, a solid state disk or CD-ROM. Software, that is, an executable program stored on program memory 502 causes the processor 501 to perform the method in FIG. 6, that is, processor 501 controls scanner 103 to measure a distance and generate distance data, controls the mover system 102 to move the scanner and generate movement data, associates the distance data with positioning data and stores the result on data memory 503. Processor 501 may also send the determined positioning data associated with the distance data via communication port 506 to a server 510, which may then calculate a quantitative trait of the plant on the current plot 101. This allows more complex calculations that would be difficult to perform on the data collector 106 due to hardware limitations of mobile computing systems.

The processor 501 may receive data, such as distance data, from data memory 503 as well as from input port 504 and the user port 505, which is connected to a display 507 that shows a visual representation 508 of the plot 101 to a user. In one example, the processor 501 receives distance data from rotary encoder via input port 504, such as by using a Wi-Fi network according to IEEE 802.11 or a CAN bus. In one example, the processor 501 receives and processes the distance data in real time. This means that the processor 501 associates and stores the distance data every time distance data of a line scan is received from rotary encoder 105 and completes this calculation before the rotary encoder 105 sends the next line scan update.

In one example, data collector 106 is implemented as a microcontroller, such as an Atmel ATmega328. Data collector 106 may comprise a counter that is incremented each time a pulse from rotary encoder 105 is detected on a pin of the microcontroller. When a line scan signal is received from the scanner 103, the microcontroller reads the value of the counter, stores the value of the counter associated with the data from the scanner 103 and resets the counter to zero.

In other examples, data collector 106 is implemented as a tablet computer that collects the data and may readily upload the data to server 510 using a cellular or Wifi network.

FIG. 5b illustrates an example data format. It is noted that the sensor 103 repeatedly measures the distance of the crops 202 from the sensor 103 along multiple lines to generate distance data for each of the multiple lines. The data collector 106 associates the distance data from each of the multiple lines with relative positioning data indicative of a relative position of that line. In FIG. 5b, data collector 106 stores the distance values as rows, such as first row 551. First row 551 has a first data field 552 for the relative positioning data and a second data field 553 for the distance data points from sensor 103. In this example, the first data fields 552 holds the number of pulses from rotary encoder 105 from the start of the plot 101. In other examples, first data field may hold the distance in metres or millimetres from the start of the plot.

Method for Scanning Crops

Figure 6:
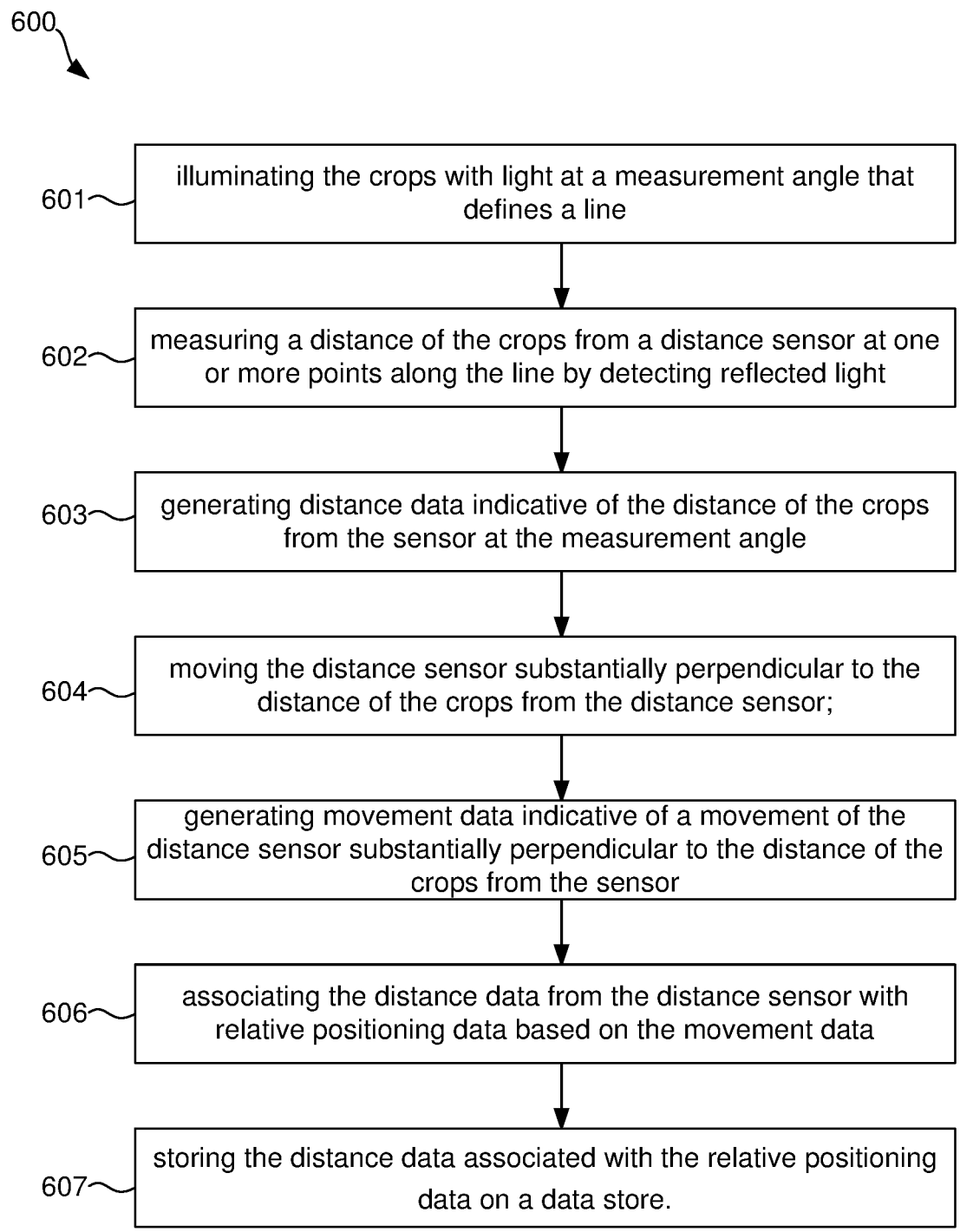
FIG. 6 illustrates a method for scanning crops.

FIG. 6 illustrates a method 600 as performed by processor 501 for scanning crops. Processor 501 generates control signals to control the distance sensor 103 to illuminate 601 the crops with laser light at a measurement angle that defines a line. Processor 501 then measures a distance of the crops from the distance sensor 103 at one or more points along the line by detecting reflected light and measuring the time of flight between illuminating the crops at step 601 and receiving the reflected light in step 602. Processor 501 uses the measurement to generate 603 distance data indicative of the distance of the crops from the sensor at the measurement angle. In one example, the distance data is generated by the distance sensor 103.

Processor 501 then generates control signals to move 604 the distance sensor substantially perpendicular to the distance of the crops from the distance sensor. In one example, an operator may move the distance sensor. Processor 501 may generate a user interface to guide the operator, such as by creating a graphical representation of the current speed in relation to the optimal speed. Processor 501 may also indicate the relative location within the plot 101 or a GPS location within the field 100.

Rotary encoder 105 generates 605 movement data indicative of a movement of the distance sensor 103 substantially perpendicular to the distance of the crops from the sensor. Processor 501 associates 606 the distance data from the distance sensor with relative positioning data based on the movement data. The relative positioning data may be the number of pulses as described above or may be derived value, such as a relative distance. Processor 501 finally stores 607 the distance data associated with the relative positioning data on a data store. For example, processor 501 stores the distance data associated with the relative positioning data on an SD card that can be removed and inserted into a computer to read-out and process the data. In another example, processor 501 stores the distance data associated with the relative positioning data on a cloud storage, which causes server 510 to process the distance data to calculate a crop trait value, such as biomass.

Uploading the distance data may comprise uploading more than 5,000 distance data points to the processing server 510 to cause the processing server 510 to calculate one crop trait value based on the more than 5,000 distance data points. In the example of an aperture angle of 70 degrees and a measurement angle increment of 1 degree and therefore a number of 70 data points per scan line, there would be more than 70 scan lines. This may relate to a plot size of 7000 mm, such that all data points of one plot are uploaded to calculate a single crop trait value. The uploading of the large number of distance data points means that only a small amount of processing power is required in the data collector 106 and the bulk of the processing for aggregating the data points can be performed on the server 510.

Processing Server

The following description provides further detail on the aggregation performed by the server 510. In particular, server 510 calculates from the large number of distance data points a single crop trait value for each plot 101. To further reduce the processing load on the data collector, the transformation from distance measurements to crop height as described with reference to FIG. 2 may be performed by the server 510. It is noted that server 510 may be hosted on desktops, laptops or mobile devices.

In one example, server 510 is implemented in a distributed (cloud) computing environment, such as Amazon AWS. In this example, when the distance data points are received, a supervisor may determine a number of virtual machines and instantiate those virtual machines on the cloud to process the distance data points as described herein. Once the distance data points are processed, the supervisor destroys the virtual machines. This allows for highly computationally expensive calculations to be performed relatively quickly without the need for investing into expensive hardware. Since the distance data from each plot can be processed separately, the specific processing task can be parallelised on multiple virtual machines effectively. In one example, the supervisor instantiates one virtual machine for each plot.

Figure 7A:
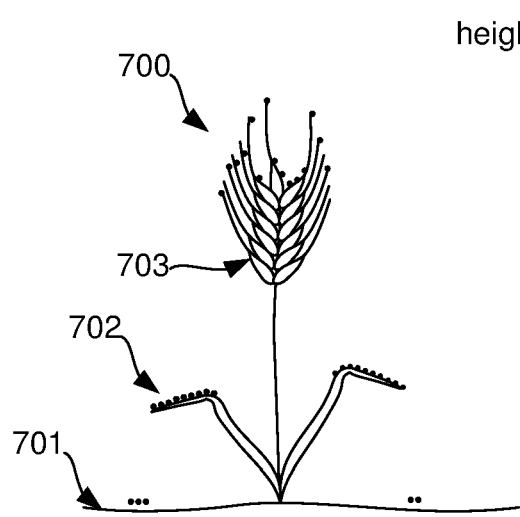
FIG. 7a illustrates a single crop with data points.
Figure 7B:
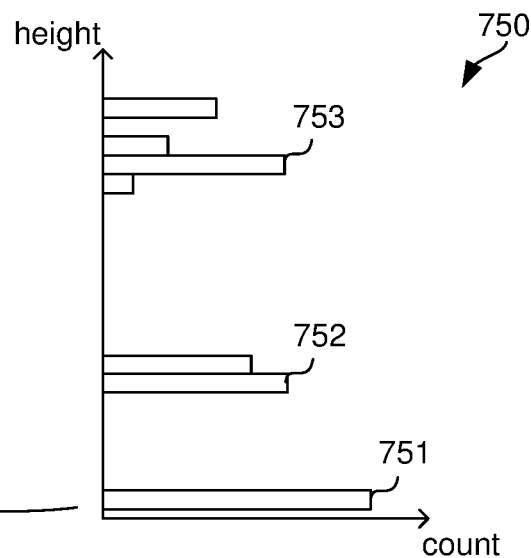
FIG. 7b illustrates a histogram of data points for one crop.

FIG. 7a illustrates a single crop 700 growing on ground 701 and having leaves 702 and seeds 703. Solid dots indicate the locations where the laser light 204 hits the crop or the ground. That is, each dot represents one distance data point. In the example of FIG. 7a it is assumed that the laser light 204 is directed vertically towards the crop 700 from the top. Server 510 can calculate for each distance data point a height measurement. Server 510 then calculates a histogram by counting the number of height measurements in each of multiple bins. FIG. 7b illustrates a histogram 750 of the height of the dots in FIG. 7a. Histogram 750 includes a first peak 751 for height measurements around zero indicating reflections off the ground 701. Histogram 750 further includes a second peak 752 indicating reflections off the leaves 702 of crop 700 and a third peak 753 indicating reflections off the seeds 703. While the histogram 750 for a single crop may be irregular, server 510 creates a similar histogram for all data points of the plot 101.

Figure 8:
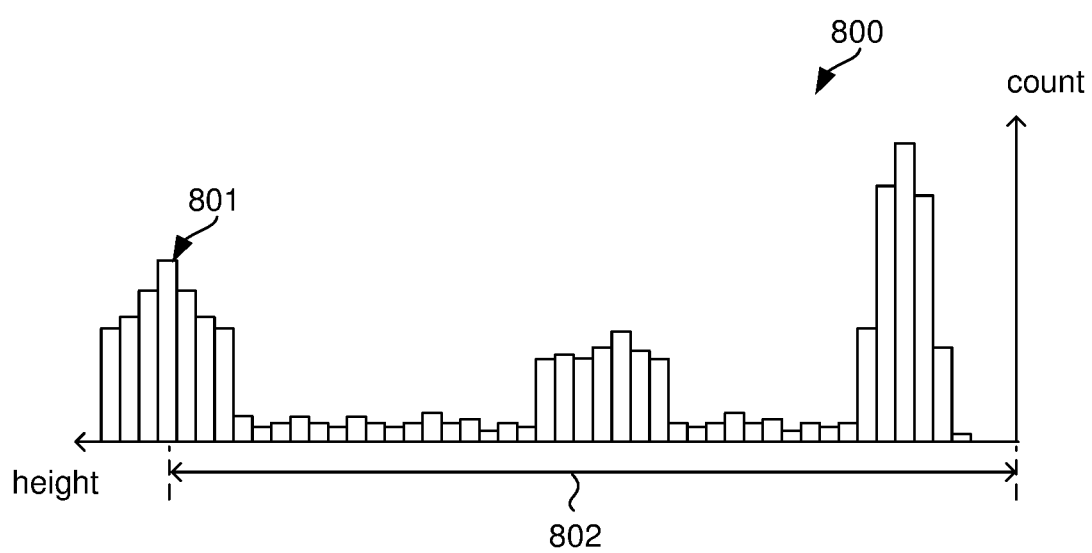
FIG. 8 illustrates a histogram for the entire plot.

FIG. 8 illustrates a histogram for the entire plot 101. Compared to FIG. 7b, the histogram in FIG. 8 is more regular. Server 510 can now extract features from the histogram. For example, server 510 may identify a first peak or maximum 801 and use a height value 802 of the first peak 801 as a feature. Server 510 may further receive historical crop trait values of sampled crops. For example, workers can cut samples from multiple plots and manually measure the biomass in these sample. Server 510 calculates the feature for each of the multiple plots and correlates the feature to the sampled biomass measurement. For example, server 510 may use a linear regression model to calculate a linear relationship between the feature, that is the height of the first peak 801, and the biomass based on the historical sample data. Server 510 can then apply this correlation, that is the linear relationship, to plot 101. This allows the server 510 to calculate an estimated biomass as a crop trait value without the need for manually and destructively sampling the plot 101. In one example, the parameters for the relationship between sampled biomass and histogram features are specific to each crop. That is, wheat would have a different relationship than rice, for example.

Server 510 may automatically detect the edges of each plot by detecting that the majority of data points have a ground value of about zero height. In one example, it is assumed that the scan line 203 spans a single plot, such that for each line all points belong to the same plot. Server 510 can then iterate over all scan lines and calculate the histogram of the current scan line. If the histogram has more peaks than the ground peak 751 then the scan line is added to the data for that plot. If the histogram has only the ground peak 751, server 510 concludes that the end of the current plot has been reached and a new plot can be started for the next scan line that shows more peaks than the ground peak 751.

Subsequently, server 510 can select out of multiple plots those with the highest estimated biomass, which means the plot is a highly performing plot. For example, server 510 may generate a user interface that shows the estimated biomass for each plot such that an operator can see which plot should be selected for further breeding. Server 510 may also generate and display a ranking of plots such that the operator can select the plot at the top of the ranking for further breeding. Each plot may be associated with a plot identifier, population or genotype and the server 510 may automatically select the plot identifier, population or genotype with the highest estimated biomass for further breeding. That is, server 510 creates a display or a digital document comprising an indication of the selected plot identifier or genotype.

Figure 9:
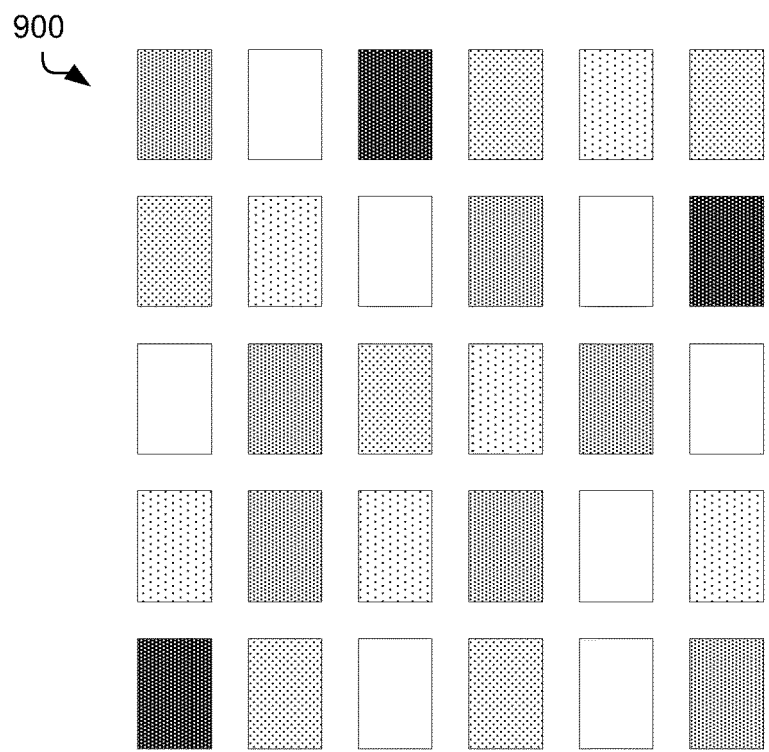
FIG. 9 illustrates a map of the field created by the server from FIG. 5.

FIG. 9 illustrates a map 900 that server 510 may create. Map 900 comprises a rectangle for each plot and the fill of each rectangle, such as colour, shading or pattern, indicates the estimated biomass or other crop trait value. For example, darker rectangles indicate plots with a higher crop trait value while lighter rectangles indicate plots with a lower crop trait value. In one example, the crops in all plots are of the same variety and the variation in crop trait values is caused by a variation in environmental conditions, such as water supply. The frequent scanning of the crops, which is enabled by this disclosure, allows the monitoring of the influence of those conditions by monitoring the crop trait value directly. Irrigation, for example, can then be automatically actuated for those plots with a lower crop trait value.

Figure 10:
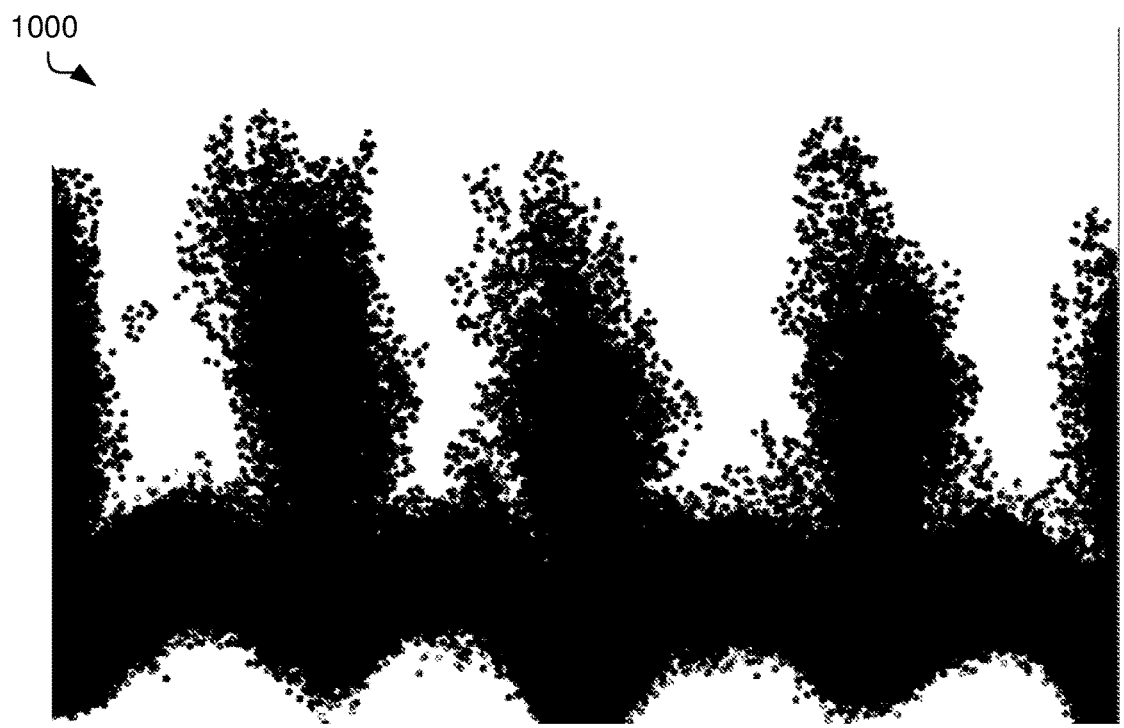
FIG. 10 illustrates an image of a plot created by the server from FIG. 5.

FIG. 10 illustrates an image 1000 that server 510 may create. To create image 1000, server 510 adds a dot for each of the data points of the current plot into the image considering only the height and the location along the scan line 203 but disregarding the location of the data points along the direction of movement 401 (shown in FIG. 4). The image 1000 clearly shows the structure of the crop and can be considered as an accumulated cross-section through the plot. This gives the operator additional insight which makes the selection of plots or genotypes or other resulting actions more accurate. In examples where the intensity of the reflected light is also part of the sensor data, the dots may also be colour coded to indicated the intensity. Since fresh leaves, dry leaves and soil have different reflectance and therefore lead to different intensities of reflected light, the colour code can graphically distinguish between these materials.

Artificial Selection

While some examples above relate to biomass production, other traits may be possible that were difficult to ascertain with existing methods. For example, biomass production during increased irrigation or other change in environment. Other time dependent traits may also be considered including change of canopy height over two weeks, for example. In further examples, traits may include Water use efficiency, Nutrient use efficiency (particularly nitrogen and phosphorus), Weed competitiveness, Tolerance of mechanical weed control, Pest/disease resistance, Early maturity (as a mechanism for avoidance of particular stresses) and Abiotic stress tolerance (i.e. drought, salinity, etc. . . . ).

It will also be understood that the artificial selection method of the present invention is useful for selecting an individual or a population of individuals or reproductive or regenerative material from the individuals for use in breeding or transgenic approach. Accordingly, the present invention also provides a process for improving the rate of genetic gain in a population comprising performing the method of the present invention according to any embodiment described herein and selecting an individual or population of individuals, such as a plot, based on one or more phenotypes, that is, a desirable estimated crop trait value. By "desirable estimated crop trait value" means a crop trait value sufficient to improve a genetic gain in the population if the selected individual or population of individuals is mated to another individual or group of individuals e.g., an individual or population of individuals that also has a desirable estimated crop trait value as determined against the same or different parameter(s). It is noted that a low crop trait value may be desirable, such as water use.

In one example, the process comprises obtaining reproductive or regenerative material from the selected individual. In the present context, the term "obtaining reproductive or regenerative material" shall be taken to include collecting and/or storing and/or maintaining germplasm such as the selected individual pollen from the selected individual, seed etc. produced using the germplasm of the selected individual, such as for use in conventional breeding programs; and collecting and/or storing and/or maintaining cells such as embryonic stem cells, pluripotent or multipotent stem cells, fibroblasts, or organelles such as nuclei, mitochondria or chloroplasts from the selected individual, optionally transformed to include one or more genes or nucleic acids for conferring a desired attribute on an organism, for the production of transformed organisms carrying the genetic material of the selected individual.

The present invention clearly extends to any reproductive or regenerative material obtained by performing the process of the present invention and an organism produced therefrom. This organism may produce a genetic gain in the population that is substantially the same as the expected genetic gain or actual genetic gain from the entire germplasm of the selected individual. As will be known to the skilled artisan, "expected genetic gain" is a theoretical value, whereas "actual genetic gain" is a value determined from test matings in a population.

The reproductive or regenerative material is generally stored for a prolonged period for subsequent use and it is desirable in such circumstances to maintain records of the material. Accordingly, the present invention also provides a computer-readable medium for use in artificial selection said computer-readable medium comprising a database of reproductive or regenerative material obtained by performing a process of the invention according to any embodiment described herein.

EXAMPLE

Crop scanner 103 may be an adaptable mobile platform for the deployment and testing of proximal imaging sensors in vineyards. A SICK LMS-400 light radar (LiDAR) mounted on scanner 103 is capable of producing precise (±3 mm) 3D point clouds of vine rows. Scans of multiple grapevine varieties and management systems have demonstrated that scanner 103 can be useful in a variety of vineyards. Furthermore, correlations between LiDAR scans and pruning weight have been determined and resulted in high R2 values (R2=0.92). The frame may include more instruments. In addition, computational processes can be improved and automated as more correlations between growth features and LiDAR scans are developed.

This disclosure provides an adaptable proximal sensing scanner 103 and demonstrates how it is able to use light radar (LiDAR) to capture point clouds of vine size and structure at a number of different growth stages with differing canopy management systems. Beyond producing 3D scans there is provided a computational method that uses LiDAR scans to estimate pruning weight, an indicator of vegetative vine vigour which requires considerable labour costs to measure.

Materials and Methods

Description of the Scanner's Platform.

In this example, the frame for scanner 103 is made of lightweight structural-aluminium and weighs ~200 kg. It is 3 m long, and has a wheelbase that can be adjusted between 1.2 and 3 m to enable operation in a variety of row spacings with maximum stability. The mast can be raised for measuring taller canopies and lowered for transportation. When raised, the mast is 3.2 m tall and stabilized by an additional aluminium support beam that is stored on the frame. Scanner 103 measures 2.1 m tall when the mast is lowered. Scanner 103's principle sensor, the LMS-400 LiDAR (FIG. 1a) can be mounted in virtually any position on the frame. There are three masts which run perpendicular to the length of scanner 103's frame on which the LiDAR could be mounted. Those mounts can be raised and lowered or moved toward or away from the centre of the frame (FIG. 1b). The mount-points are in positions in front of or away from the frame so that line-scan sensors can be used without any interference from the frame. The LiDAR can be rotated to scan anywhere from zero degrees, pointing straight at the ground, 90 degrees, pointed straight at the canopy, or 180 degrees, positioned underneath the canopy, aimed skyward. For all the scans presented here the LiDAR was mounted 2.25 m above the ground, on the centre mast and angled 45 degrees.

The frame is equipped with three wheels: the front two wheels have built-in electric motors and there was one free-pivoting wheel in the rear. The rear tire is 21 inches in diameter and allows scanner 103 to have a zero degree turn radius, which was important for two reasons: First, looping between vineyard rows may be difficult if the platform was less manoeuvrable. Second, since the front two wheels are powered independently, scanner 103 can be programmed to operate autonomously. The two wheels in the front are 16 inch MagicPie 4 eBike-motors (Golden Motor Technology Co. Ltd., Changzhou, China). Each wheel is powered independently by a 48v lithium ion battery (Golden Motor Technology Co. Ltd., Changzhou, China). The wheels are operated and driving speed is controlled by two thumb-throttle controllers mounted on scanner 103's rear handle bars.

Scanner 103 is also equipped with a 24v lithium ion battery (Golden Motor Technology Co. Ltd., Changzhou, China) which is used to power the instruments. The power from the battery is converted into four separate outputs: a 5v output, two 12v outputs and a 24v output (Helios Power Solutions Pty. Ltd., Sydney, Australia). A variety of voltages is created to power and test different sensors.

LiDAR Sensor Specifications

The LiDAR mounted to scanner 103 is a SICK model LMS-400-2000 (FIG. 1a; SICK AG, Waldkirch, Germany). The laser is an eye-safe red laser (650 nm) and scans a 70 degree field of view. The LMS-400 has a range of 0.7 m to 3 m and can be programmed to scan between speeds of 250 to 500 Hz. The LiDAR produces polar coordinates (distance and angle) from the resolved time of flight from the laser, which are then converted to xyz coordinates to generate a point cloud. Additionally, the LiDAR produces information about the reflectance of the scanned surface. The reflectance value is related to the ability of a material to reflect the LiDAR signal back to the sensor: the higher the reflectance value, the more reflective the surface.

The linear distance travelled by-scanner 103 is measured with a wheel encoder which provides sub-millimetre distance resolution. Viewed from the handlebars, the wheel encoder is in contact with the front left tire. (DFV60A-22PC65536, SICK AG, Waldkirch, Germany). The LiDAR and encoder data are integrated via a junction box (SICK CMD490-0103; SICK AG, Waldkirch, Germany). A Spatial GPS/IMU (Advanced Navigation, Sydney Australia) unit is attached with double-sided tape to the top of the LiDAR. The Spatial unit is used to record data about the angle of the LiDAR and scanner 103's spatial position (±2 m). The LiDAR, GPS and encoder data are captured using the field laptop running bespoke java software, which provides a user interface presenting a map of the GPS, input dialogs for the experiment name and run number. The LiDAR data is stored in a custom binary format (.PLF), while the GPS and encoder are combined and stored as text comma separated values (CSV) file format (.GPS).

Data Processing

A custom-made piece of java software converts the .PLF and .GPS data to a standard point cloud format such as the Stanford triangle format (.PLY). The integrated point cloud and encoder data, saved as a .PLY file, are visualized using the open-source software CloudCompare. Point clouds are processed and cleaned using two applications. First the points are filtered by their reflective intensity, or reflectance values, using an intensity selection plugin built into Cloud-Compare. All points with reflective intensities less than or equal to 1 are removed. Second, PCL wrapper plugin is used, which employs a nearest neighbour filtering algorithm. In detail, 10 points are used for mean point distance estimation and the standard deviation multiplier threshold is 1.00.

Results

Prototype Testing Resulted in Effective Transport and Collection

Scanner 103 is capable of being wheeled onto a trailer by one person, anchored and ready for transport in ~30 minutes. The ease of transport gives the platform an advantage over some previous phenotyping platforms which are more cumbersome and difficult to transport.

Scanner 103 is driven at an average speed of 1 m/s. Given that both sides of the vine had to be scanned, a one km vineyard-row is able to be scanned every hour.

Initial testing highlights the importance of scanning speed. Slower speeds and denser scans may result in more effective post-processing and filtering of data. Additionally, the density of the point cloud affects one's ability to correlate LiDAR scans to biological parameters. The fast scanning rate of the LMS-400 is beneficial for volume based determinations of biomass.

Workflow Description: Plot Selection and Scan Cleaning Using Two Filters

The first step in the workflow is choosing an area to scan. Because of the adjustable wheel base, scanner 103 could be used in almost any commercial vineyard. Vines in an test were of the variety Shiraz grown at a research vineyard in Adelaide, South Australia. The smallest units identified for scans were single, ~3.6 m panels (3 vines per panel, with spacing between vines of 1.8 m) and the largest area scanned, to date, was a 500 m row containing 93 similar sized panels (data not shown). The 500 m row produced ~1 GB .PLY files for visualization.

After a scan was saved and visualized in CloudCompare, the point cloud was cleared of erroneous data points. Although the LMS-400 gives precise spatial and reflectance data at a high rate, it is designed to operate below 2000 lux and not under high light conditions. Lux values in indirect sunlight commonly range between 1 thousand lux on an overcast day to 130 thousand in direct sunlight. High light levels are the cause of spurious, low-intensity blue points seen between the LiDAR and the vines. However, the erroneous measurements are all low reflectance values and can be removed by filtering the scan based on a set reflectance value. Points with reflectance values ≤1.0 were removed from the scan using the 'filter points by value' plugin in CloudCompare. There are 1.49 million total points, and 28% of those points were ≤1.0. The reflectance threshold was chosen qualitatively and removed spurious points without significantly affecting the biological interpretation of the scan. Green leaf material had a reflectance value between one and five.

As with any LiDAR scan, there was scattering at the edges of objects, where light is reflected in unpredictable ways. The nearest neighbor statistical outlier plugin in CloudCompare removed sparse outliers based off the distance of an individual point from its neighbors. By applying these filters, point-clouds were reduced to only the scanned objects. There may be 1.12 million points. After the filter removing statistical outliers is applied there are 1.04 million points in the final point cloud on which any computational analysis would be performed.

LiDAR is Able to Capture Vine Size and Structure at all Growth Stages

After establishing a consistent point-cloud pre-processing workflow, scanner 103 was used to scan a diversity of vine growth throughout 2015 growing season. Vines differ remarkably in size, age, management style and variety, which ultimately affects fruit quality and productivity. Thus, it was important to test the practical limitations of LiDAR on a variety of vines and growth-stages.

Preliminary measurements were encouraging and showed that LiDAR was able to effectively capture detailed vegetative data for minimally pruned canopies and of spur pruned vines trained on a two wire vertical trellis typical of many Australian vineyards: and leafless vines in the winter.

It is worth noting that reflectance values of vine growth were distinct between different vine organs. For example, the woody stem has a higher reflectance value (more reflective of the red-laser) than the green leaves. Additionally, as leaves senesce and yellow at the end of the season losing their green color, they become less absorptive. Red wavelength LiDAR could potentially be used to monitor senescence or the incidence of disease in the field. A LiDAR could be used to monitor multiple traits.

Preliminary computational analysis of LiDAR scans by voxelization correlate with measurements of pruning weights.

There are a number of growth, as opposed to physiological, features that vineyard managers and breeders are interested in measuring. Parameters include: leaf area, canopy porosity and vine vigour.

During the winter growing season of 2015, the pruning weight of Shiraz [(grown at the South Australian Research and Development Institute (SARDI) research vineyard at Nuriootpa, South Australia]) was compared to LiDAR scans made before and after pruning. Point clouds were processed using the workflow described earlier. Scans made before and after pruning were voxelized using the Octree function within CloudCompare. The Octree algorithm recursively divides the point cloud into smaller and smaller eights (For more see: http://docs.pointclouds.org/trunk/group_octree.html). The voxel difference between the scans was calculated as follows:

$$V\text{Before}(R) - V\text{After}(R) = V\text{Diff}(R) \quad (1)$$

Where The voxel number before pruning at recursive level 'R' (VBefore(R)) was subtracted from the number of voxels after pruning (VAfter(R)) at the same level of recursion to yield the difference (VDiff(R)). The difference between the before and after scans correlated well with destructive measures of pruning weight; (Table 1; Table S1). At the 10th level of recursion, the R2 between pruning weight and scan difference was 0.92. The raw data showing the pruning weights and voxel numbers for each scan can be found in the supplemental data (Table S1).

| Recursion Level$_{(R)}$ | 6 | 7 | 8 | 9 | 10 | 11 |
|---|---|---|---|---|---|---|
| $R^2$($V_{Diff(R)}$ vs. weight) | 0.088 | 0.467 | 0.705 | 0.864 | 0.916 | 0.778 |

Table 1. shows the R2 of the linear correlation between the voxel difference (VDiff(R)) and pruning weight at increasing levels of octree voxelization (Recursion level (R)). Levels of recursion range from six to eleven. The highest R2 value was recursion level 10, highlighted in bold font.

Our data show that computational procedures, i.e. voxelization difference (eq. 1), and a laser with a high-scan-rate LiDAR can accurately and efficiently measure pruning weight. It is notable that this was possible and effective using a simple, open-source algorithm. However, this preliminary work on pruning weight can be expanded to a number of different varieties, at different locations and exposed to biotic and abiotic stresses to see if the correlation holds up.

Future work with scanner 103 will focus on ground-truthing LiDAR scans of vines against a number of other growth parameters, vegetative and reproductive.

Also, because of the ability of the LMS-400 to detect the reflectivity of a surface, the LiDAR may be able to distinguish leaves from bunches and estimate yield.

CONCLUSIONS

This disclosure provides scanner 103 as a proximal sensing platform for use in Australian vineyards. Its frame will provide a flexible platform for testing multiple sensors in a variety of regions, management styles and grape varieties. To date, the principal sensor on the frame is a LiDAR scanner. The 2D line scanner can scan one side of the vine canopy at a time and produce high definition 3D point clouds of vine growth. The ability of the LiDAR to capture growth features has not been limited to any specific variety of vine or management style It may be possible to achieve ground-truthing LiDAR scans and include data from any additional instruments—with conventional measurements of vine growth. As well as incorporating other types of sensors, such as stereo-RGB cameras and hyperspectral scanners.

The present invention further extends to products, including food products, derived from the organisms obtained through the above methods and systems for artificial selection. Food products include bread and flour derived from these organisms.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A system for scanning crops, the system comprising:
   a line scan distance sensor to measure a distance of the crops from the sensor at one or more points along a line by illuminating the crops with light at a measurement angle that defines the line and detecting reflected light, and to generate distance data indicative of the distance of the crops from the sensor at the measurement angle at a scanning rate of line scans;
   a mover system to move the line scan distance sensor or the crops substantially perpendicular to the distance of the crops from the sensor;
   a rotary encoder associated with the mover system to generate movement data indicative of a movement of the distance sensor or the crops substantially perpendicular to the distance of the crops from the sensor at an encoder rate that is higher than the scanning rate of line scans from the line scan distance sensor when the mover moves the line scan distance sensor at a scanning speed; and
   a data collector to associate the distance data from the distance sensor with relative positioning data based on the movement data from the rotary encoder and to store the distance data associated with the relative positioning data on a data store.

2. The system of claim 1, wherein the mover is a vehicle or a gantry.

3. The system of claim 1, wherein the line scan distance sensor is downwardly directed towards the ground or the line scan distance sensor is directed sidewardly.

4. The system of claim 1, wherein the relative positioning data has an accuracy of 1 cm or higher,
   the scanning speed is 1 m/s or faster,
   the scanning rate is 500 Hz or less, and
   the encoder rate is at least ten times higher than the scanning rate.

5. The system of claim 1, wherein the line scan distance sensor is further configured to generate intensity data indicative of an intensity of the reflected light and the data collector is configured to associate the intensity data from the distance sensor with relative positioning data based on the movement data from the rotary encoder and to store the intensity data associated with the relative positioning data on the data store.

6. The system of claim 1, wherein the light is laser light having a wavelength between 625 nm and 740 nm.

7. The system of claim 1, further comprising a second line scan distance sensor to measure a distance of the crops from the second line scan distance sensor along the line, wherein the second line scan distance sensor is offset or tilted relative to the first line scan distance sensor.

8. The system of claim 1, wherein
the line scan distance sensor is configured to repeatedly measure the distance of the crops from the sensor along multiple lines to generate distance data for each of the multiple lines, and
the data collector is configured to associate the distance data from each of the multiple lines with relative positioning data indicative of a relative position of that line.

9. A method for scanning crops, the method comprising:
illuminating the crops with light at a measurement angle that defines a line;
measuring a distance of the crops from a distance sensor at one or more points along the line by detecting reflected light;
generating distance data indicative of the distance of the crops from the sensor at the measurement angle at a scanning rate;
moving the distance sensor or the crops substantially perpendicular to the distance of the crops from the distance sensor;
generating movement data indicative of a movement of the distance sensor or the crops substantially perpendicular to the distance of the crops from the sensor at an encoder rate that is higher than the scanning rate of line scans from the distance sensor when moving the distance sensor at a scanning speed;
associating the distance data from the distance sensor with relative positioning data based on the movement data; and
storing the distance data associated with the relative positioning data on a data store.

10. The method of claim 9, further comprising uploading the distance data associated with the relative positioning data to a processing server to cause the processing server to calculate a crop trait value.

11. The method of claim 10, wherein uploading the distance data comprises uploading more than 5,000 distance data points to the processing server to cause the processing server to calculate one crop trait value based on the more than 5,000 distance data points.

12. The method of claim 9, wherein the measuring the distance of the crops from the distance sensor comprises providing a scan angle value associated with a distance value and generating the distance data comprises calculating a crop height above ground based on the distance value and the scan angle value.

13. The method of claim 9, further comprising:
aggregating the distance data into a crop trait value for the monitoring area based on the distance data.

14. The method of claim 13, wherein the distance data further comprises intensity data and aggregating the distance data comprises aggregating the intensity data into the crop trait value.

15. The method of claim 13 wherein the distance data comprises multiple line scans of multiple monitoring areas and aggregating the distance data comprises aggregating the distance data for each of the multiple monitoring areas into a crop trait value for each of the multiple monitoring areas.

16. The method of claim 15, further comprising selecting a population associated with one of the multiple monitoring areas based on the crop trait value for further breeding.

17. The method of claim 13, wherein aggregating the distance data into a crop trait value is based on correlation data indicative of a correlation between historical distance data and historical crop trait values, wherein the historical crop trait values are indicative of measured historical crop trait values of sampled crops.

18. The method of claim 17, further comprising determining the correlation data by performing machine learning on the historical distance data and historical crop trait values.

19. A computer system for crop trait identification comprising:
an input port to receive distance data comprising multiple line scans of a monitoring area measured at a scanning rate, each of the multiple line scans being associated with relative positioning data indicative of a relative position corresponding to that line scan within the monitoring area; and
a processor to aggregate the distance data into a crop trait value for the monitoring area based on the distance data and the relative positioning data, wherein the relative positioning data is indicative of a rotary encoder output having an encoder rate that is higher than the scanning rate of line scans from a line scan distance sensor when a mover moves the line scan distance sensor at a scanning speed.

20. Reproductive or regenerative material obtained by performing the method of claim 13, a plant produced from the reproductive or regenerative material obtained by performing the method of claim 13, or a food product derived from the plant produced from the reproductive or regenerative material obtained by performing the method of claim 13.

* * * * *